(12) United States Patent
Cluzet et al.

(10) Patent No.: US 6,626,231 B2
(45) Date of Patent: Sep. 30, 2003

(54) HEAT TRANSFER DEVICE

(75) Inventors: Gérard Cluzet, Mandelieu (FR); Marcel Amidieu, Cannes la Bocca (FR); Tisna Tjiptahardja, Cannes la Bocca (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/208,864

(22) Filed: Aug. 1, 2002

(65) Prior Publication Data

US 2003/0051857 A1 Mar. 20, 2003

(30) Foreign Application Priority Data

Sep. 18, 2001 (FR) .............................. 01 12059

(51) Int. Cl.[7] .................................. F28F 3/00
(52) U.S. Cl. .................. 165/41; 165/46; 244/158 R; 244/159
(58) Field of Search .................... 165/41, 46, 86, 165/104.76, 104.33; 244/158 R, 159

(56) References Cited

U.S. PATENT DOCUMENTS

| 4,832,113 A | * | 5/1989 | Mims et al. ................. 165/41 |
| 5,036,905 A | | 8/1991 | Eninger et al. |
| 5,372,183 A | * | 12/1994 | Strickberger ................. 165/41 |
| 5,743,325 A | | 4/1998 | Esposto |
| 5,787,969 A | * | 8/1998 | Drolen et al. ................. 165/41 |
| 5,806,800 A | * | 9/1998 | Caplin ..................... 244/158 R |
| 5,806,803 A | * | 9/1998 | Watts ......................... 244/163 |
| 5,954,298 A | * | 9/1999 | Basuthakur et al. .... 244/158 R |
| 6,439,297 B1 | * | 8/2002 | Dunbar et al. ................. 165/46 |

FOREIGN PATENT DOCUMENTS

EP 0 822 139 A1 2/1998

* cited by examiner

Primary Examiner—Henry Bennett
Assistant Examiner—Terrell McKinnon
(74) Attorney, Agent, or Firm—Sughrue Mion, PLLC

(57) ABSTRACT

A heat transfer device includes a capillary-pumped first fluid loop including an evaporator situated on a satellite in the vicinity of a source of dissipated heat and a condenser connected by heat transfer members to the evaporator and situated on a deployable radiator panel of the satellite. The deployable radiator comprises at least two panels, and the heat transfer device itself further comprises at least one second capillary-pumped fluid loop. The fluid loops are connected in cascade with each other so that the evaporator of each fluid loop other than the first fluid loop is on the same panel as the condenser of the preceding loop and the condenser of each fluid loop other than the first fluid loop is on the panel next to that carrying the condenser of the first loop. The evaporator of one loop is connected to the condenser of the same loop by flexible heat transfer members.

4 Claims, 2 Drawing Sheets

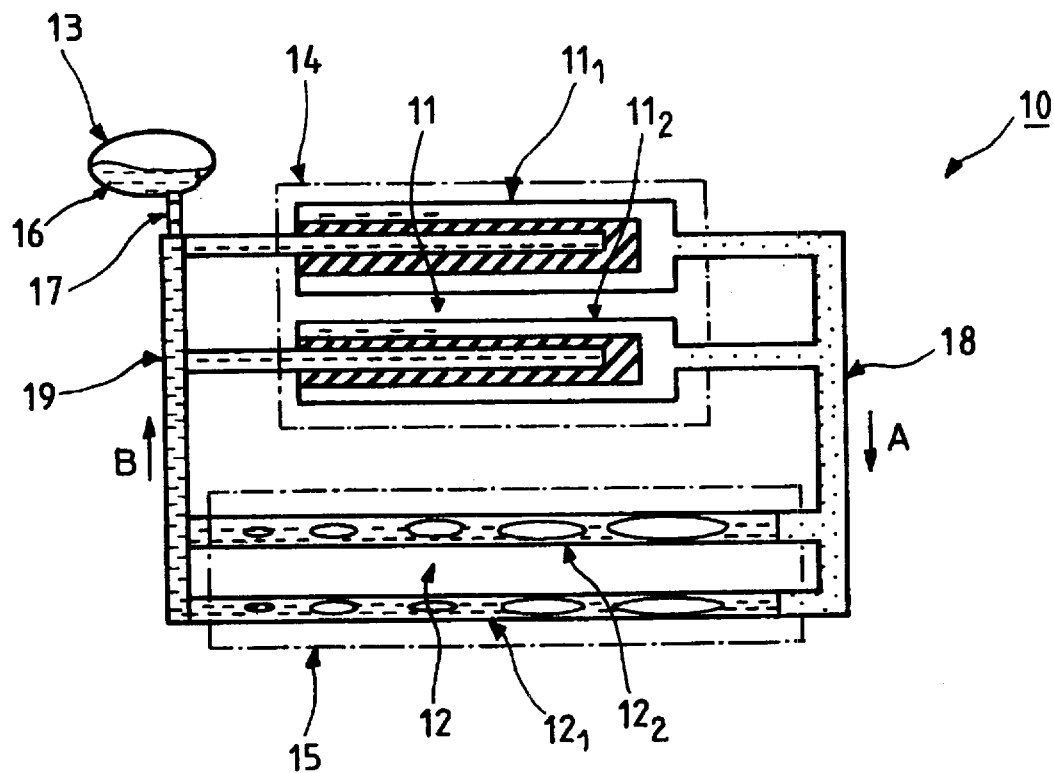
FIG_1
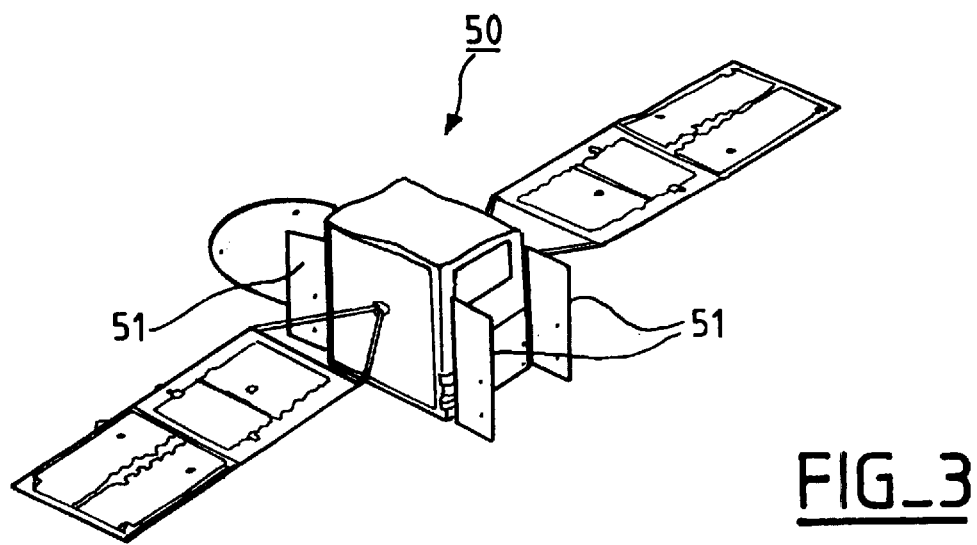
FIG_3

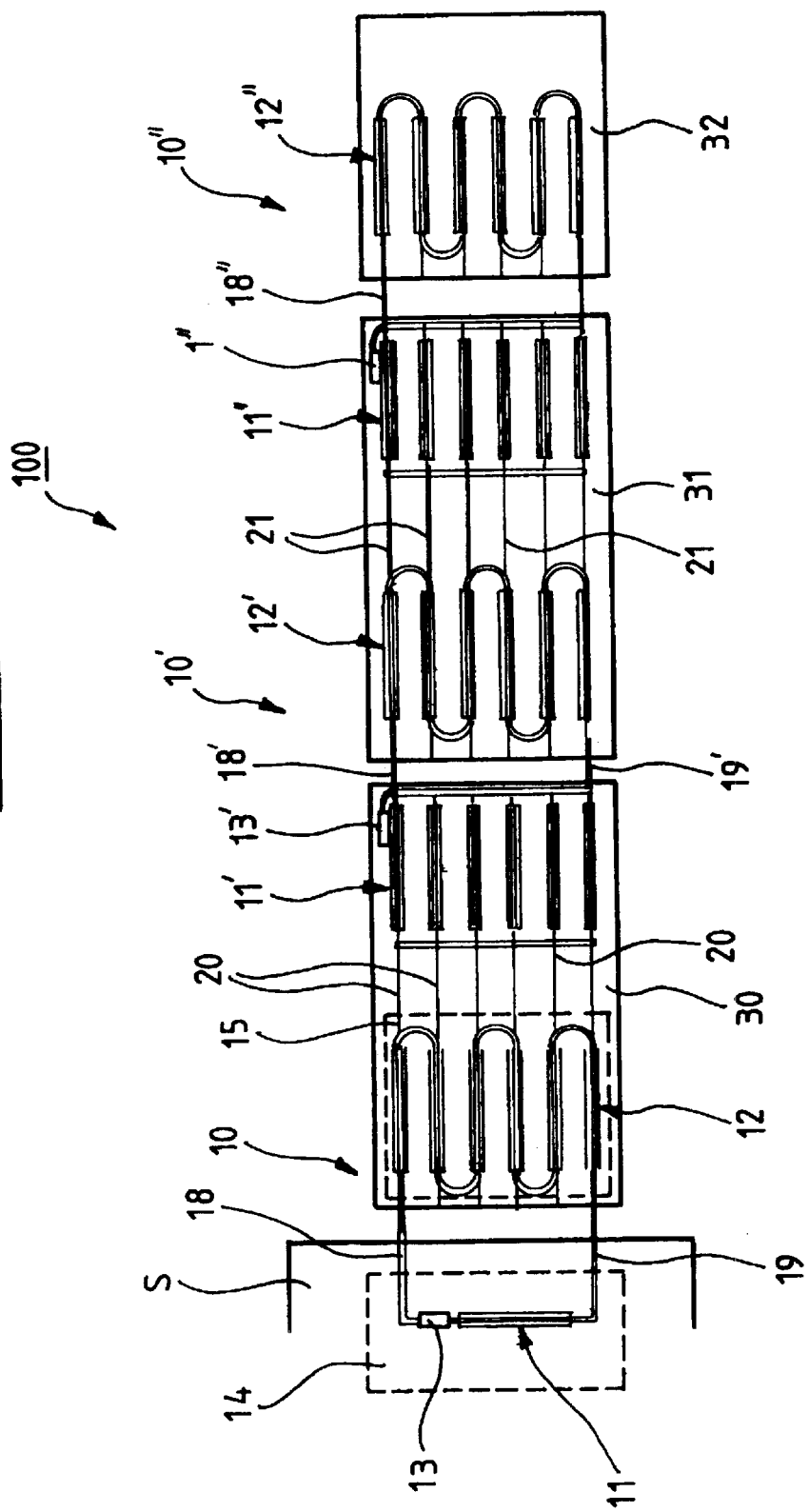
FIG_2

HEAT TRANSFER DEVICE

CROSS-REFERENCE TO RELATED APPLICATIONS

This application is based on French Patent Application No. 01 12 059 filed Sep. 18, 2001, the disclosure of which is hereby incorporated by reference thereto in its entirety, and the priority of which is hereby claimed under 35 U.S.C. §119.

BACKGROUND OF THE INVENTION

1. Field of the invention

The present invention concerns a heat transfer device, in particular a heat transfer device suitable for evacuating the dissipated heat generated by onboard equipment on board a satellite.

2. Description of the prior art

The equipment on board an operational satellite in orbit dissipates a great deal of heat. It is therefore necessary to provide a heat transfer device for evacuating heat to prevent the satellite from overheating by transferring heat from the interior of the satellite to space.

A number of prior art heat transfer systems include one or more deployable radiators connected to the satellite and provided with a heat transfer device. The heat transfer device is always based on the use of a fluid flowing between a hot area, i.e. an area in which heat is dissipated, and a cold area, i.e. an area in which the heat absorbed by the fluid is transferred to the external environment. The operating principle of these devices is therefore based on the evaporation/condensation properties of the fluid used.

A first type of prior art heat transfer device is the heat pipe. This system includes a metal (for example aluminum) tube in which flows a heat exchange fluid (generally ammonia) and uses the properties of two-phase liquid-vapor flow and the capillary properties of liquids. Thus a heat pipe is a two-phase closed system in which vapor created in the hot area (evaporation area) is aspirated toward the cold area (where the pressure is lower), where it condenses on the metal wall of the tube. The liquid phase of the fluid used travels along the metal wall of the tube in the opposite direction to that in which the vapor phase of the fluid, which remains confined to the center of the tube, flows. This return of the fluid along the wall is achieved by a capillary structure (wick or longitudinal grooves) connecting the two ends of the tube and which serves both as a capillary pump and as a separator of the two liquid-vapor phases.

Heat transfer devices using heat pipes, although widely used in satellites, nevertheless give rise to a number of problems.

First of all, their performance in terms of heat transport capacity is limited to a few hundred W.m. Accordingly, these heat transfer devices are inadequate for high-power telecommunication satellites and are ill-suited to the distances and the heat paths between the hot and cold sources.

Furthermore, for thermal tests to be carried out on the ground, it is necessary to ensure that the heat pipes are horizontal or to have the evaporation areas below the condensation areas, as otherwise the liquid must rise by capillary action, against the force of gravity.

Accordingly, the use of single-phase or two-phase fluid-loop heat transfer devices has been preferred.

Single-phase fluid-loop heat transfer devices operate in accordance with a principle similar to that of central heating, using the sensible heat of the fluid, and therefore with high temperature variations. The fluid used in the heat transfer device (freon, water, ammonia, etc) absorbs the heat dissipated by the equipment, and its temperature therefore rises, and rejects that heat when it is cooled in one or more radiators.

Although capable of absorbing significantly more heat than is possible using heat pipes, this type of heat transfer device is nevertheless unsatisfactory, in particular for high-power satellites.

In effect, they are active devices and require mechanical pumping using an electrically powered pump, which must produce a high fluid flowrate, because of the transfer principle employed. They therefore consume too much pumping power for effective heat control.

What is more, a mechanical pump gives rise to problems of vibration, maintenance and service life.

Accordingly, at present it is preferred to use two-phase capillary-pumped fluid loops using, like heat pipes, the latent heat of evaporation of the fluid to absorb and reject heat. The heat exchange fluid then changes state when it flows in the loop. It evaporates on absorbing heat dissipated by the equipment in the evaporator and condenses, rejecting the heat into one or more condensers on the radiator. The fluid is circulated by a capillary pump in the evaporator. The vapor and liquid phases are separated, except in the condenser where they flow in the same direction, in contrast to the heat pipe, in which the two phases flow in opposite directions in the same tube.

In terms of heat transfer capacity, this type of heat transfer device is significantly more effective than heat pipes for a much more limited capillary structure (only the evaporator has this pumping structure).

However, there are still problems for high-power satellites such as modern telecommunication satellites.

In effect, given the powers to be dissipated within such satellites, large surface areas are required on the deployable radiators. These surface areas can no longer be obtained from a radiator with only one panel, whose surface area can only with difficulty exceed a few $m^2$, whereas an additional global radiating surface area of 60 $m^2$ is needed.

Accordingly, the deployable radiators must comprise a plurality of mechanically interconnected panels.

The drive pressure available in two-phase capillary-pumped fluid loops limits the heat transfer distance for high powers. Accordingly, the same two-phase capillary-pumped fluid loop cannot be used from one end to the other of the panels of a large deployable radiator.

The object of the present invention is therefore to provide a heat transfer device for use on board a high-power satellite and in particular for use in conjunction with deployable radiators of said satellite including a plurality of panels, without significant limitation of its heat transfer capacity.

SUMMARY OF THE INVENTION

To this end the present invention proposes a heat transfer device including a capillary-pumped first fluid loop including an evaporator situated on a satellite in the vicinity of a source of dissipated heat and a condenser connected by heat transfer means to the evaporator and situated on a deployable radiator panel of the satellite, in which heat transfer device the deployable radiator comprises at least two panels, the heat transfer device itself further comprises at least one second capillary-pumped fluid loop, the fluid loops are connected in cascade with each other so that the evaporator of each fluid loop other than the first fluid loop is on the same panel as the condenser of the preceding loop and the condenser of each fluid loop other than the first fluid loop is on the panel next to that carrying the condenser of the first loop, and the evaporator of one loop is connected to the condenser of the same loop by flexible heat transfer means.

Thus, according to the invention, a plurality of cascaded loops is used instead of using a single capillary-pumped fluid loop over the whole of the surface area of the panels of the deployable radiator.

This provides a reliable, passive and modular system for evacuating the heat dissipated by high-power satellites in particular. The flexible heat transfer means enable the deployable radiator to be folded up, in particular before injecting the satellite into its orbit.

In an advantageous embodiment of the invention, heat is transferred between the condenser of one loop and the evaporator of the next loop by means of at least one heat pipe. This assures efficient transfer from one loop to the other.

Also, the evaporator of one or more loops can be formed of a plurality of individual evaporator circuits connected in parallel or in series with each other.

Similarly, the condenser of one or more loops can be formed of a plurality of individual condenser circuits connected in parallel or in series with each other.

Other features and advantages of the present invention will become apparent on reading the following description of one embodiment of the invention, which is given by way of illustrative and non-limiting example.

BRIEF DESCRIPTION OF THE DRAWINGS

FIG. 1 is a theoretical diagram of a two-phase capillary-pumped fluid loop.

FIG. 2 shows diagrammatically a heat transfer device according to the invention installed on the panels of a deployable radiator of a satellite.

FIG. 3 shows very diagrammatically a satellite provided with deployable radiators.

DETAILED DESCRIPTION OF THE PREFERRED EMBODIMENT

Items common to more than one figure carry the same reference number in all the figures in which they appear.

The theory of the two-phase capillary-pumped fluid loop is explained next with reference to FIG. 1.

FIG. 1 shows a capillary-pumped loop (CPL) 10 comprising an evaporator 11, a condenser 12 and a pressurized tank 13. Also shown diagrammatically and in chain-dotted outline are a heat source 14, i.e. the equipment (not shown) dissipating heat on board the satellite, and in whose vicinity the evaporator 11 is located, and a heat evacuation area 15 on a deployable radiator panel (not shown) of the satellite, in whose vicinity the condenser 12 is located.

The tank 13 of heat exchange fluid 16, for example ammonia, feeds the loop 10 with fluid via a line 17. The fluid 16 enters the evaporator 11, in which it evaporates, in the liquid state, as symbolized by cross-hatching in FIG. 1. The resulting vapor (symbolized by dots in FIG. 1) flows toward the condenser 12 via a line 18.

The vapor is then condensed to liquid in the condenser 12 and returns to the evaporator via a line 19.

The evaporator 11 has a capillary internal structure (not shown). It comprises two evaporator tubes $11_1$, $11_2$ connected in parallel and having on their internal surface longitudinal and circumferential grooves extending from one end to the other of their length. Thus liquid arriving in the evaporator 11 is aspirated radially through the capillary wick and heated as it progresses at a very low flowrate toward the outside of the evaporator, where the source of the heat to be dissipated is located. It then evaporates on the surface of the evaporator, where capillary force initiator menisci are formed. The increase in capillary pressure in the wick is proportional to the surface tension of the fluid 16 and inversely proportional to the equivalent radii of the menisci.

Thus on leaving the capillary wick of the evaporator 11, the vapor is collected in the external enclosure of the evaporator 11, which is interfaced directly to the heat source 14. Because of the capillary pumping pressure in the loop 10, the vapor is then directed into the vapor line and flows to the condenser 12, which comprises two condenser circuits $12_1$ and $12_2$ connected in parallel.

The pressurized tank 13 regulates the operating temperature of the loop 10 and is provided with a pump for priming the loop 10.

The lines 18 and 19 are simple tubes which have low pressure losses and are very light in weight; they can be bent very easily because of their intrinsic flexibility. They are generally made of aluminum alloy or steel and have an inside diameter from 4 to 10 mm.

A heat transfer device according to the invention using a plurality of cascaded two-phase capillary-pumped fluid loops is shown in FIG. 2 and is described next.

Thus FIG. 2 shows a heat transfer device 100 according to the invention. The heat transfer device 100 includes a plurality of cascaded capillary-pumped fluid loops; FIG. 2 shows three of the loops. The FIG. therefore shows the loop 10 from FIG. 1, and two other loops 10' and 10" of the same type as the loop 10; the evaporator 11 and the condenser 12 are shown somewhat diagrammatically.

The various components of the loops 10' and 10" carry the same reference numbers as the corresponding components of the loop 10, distinguished by appending an apostrophe (') or a quote mark ("), according to whether they are respectively part of the loop 10' or part of the loop 10".

As previously explained, the evaporator 11 of the loop 10 is near the heat source 14 on the satellite S, which is shown very diagrammatically in FIG. 2, and the condenser 12 is on a panel 30 of the deployable radiator RD of the satellite S. Because the evaporator 11 and the condenser 12 of the loop 10 are interconnected by means of lines 18 and 19 in the form of flexible tubes, there is no problem when the radiator RD is folded up.

The deployable radiator RD comprises a plurality of panels, here three panels 30, 31 and 32, which are mechanically interconnected by means that are not shown. The panels are folded against each other initially (before the satellite is launched into its orbit). After the satellite is launched and injected into its orbit, the panels are deployed to constitute a large heat evacuation surface, as needed by modern high-power satellites in particular.

For satellites of this type, the area needed for heat evacuation is very large, typically of the order of 40 m². To this end, the satellite has four deployable radiators each comprising three 3.3 m² panels. The four deployable radiators are disposed at corners of the satellite, for example, which is substantially parallelepiped-shaped.

To show the conventional position of deployable radiators in a satellite, FIG. 3 shows diagrammatically a satellite 50 with four deployable radiators 51 (only three of which can be seen in FIG. 3). To simplify the drawing the deployable radiators are shown as single-panel radiators, but they can be replaced with multipanel radiators like that shown in FIG. 2.

According to the invention, the loop 10 is connected to the loop 10' by heat transfer means 20 such as heat pipes integrated into the panel 30; the loop 10' is in turn connected to the loop 10" by heat transfer means 21 such as heat pipes integrated into the panel 31.

To be more precise, the evaporator 11' of the loop 10" (comprising a plurality of individual evaporator circuits connected in parallel) is on the panel 30 and is connected by the heat pipes 20 to the condenser 12 of the loop 10, which is also on the panel 30.

The condenser 12' of the loop 10' (comprising a plurality of individual condenser circuits connected in series) is on the panel 31 and is connected to the evaporator 11' by lines 18', 19' in the form of flexible tubes. These flexible tubes enable the deployable radiator RD to be stowed in a folded configuration without difficulty.

Similarly, the evaporator 11" of the loop 10" (comprising a plurality of individual evaporator circuits connected in parallel) is on the panel 31 and is connected by the heat pipes 21 to the condenser 12' of the loop 10', which is also on the panel 31.

The condenser 12" of the loop 10" (comprising a plurality of individual condenser circuits connected in series) is on the panel 32 and is connected by lines 18", 19" in the form of flexible tubes to the evaporator 11". These flexible tubes also enable the deployable radiator RD to be stowed in a folded configuration without difficulty.

The heat transfer device 100 in accordance with the invention operates in the following manner, to evacuate a thermal power P0.

The power P0 is transferred from the satellite S to the panel 30 via the loop 10. By means of the integral heat pipes 20 and the two radiating faces of the panel 30, the panel evacuates into space a power P1 less than P0.

The power P0-P1 is transferred from the panel 30 to the panel 31 by the loop 10'. By means of the integral heat pipes 21 and the two radiating faces of the panel 30', the latter evacuates into space a power P2 less than P1 and less than P0-P1.

The power P0-P1-P2 is finally transferred from the panel 30' to the panel 30" via the loop 10" and evacuated into space by the two radiating faces of the panel 30".

The present invention is not limited to the embodiment that has just been described.

In particular, the two-phase capillary-pumped fluid loops used can be of the CPL type or of the loop heat pipe (LHP) type.

Heat is transferred between the condenser of one loop and the evaporator of the next loop by at least one heat pipe, forming part of a network of heat pipes, for example, or directly without such means.

The loops can be interconnected either by integrated heat pipes or directly.

The heat exchange fluid used can be of any suitable type, other than ammonia, depending on the operating temperature range and the required performance.

Each evaporator can comprise a plurality of individual evaporator circuits connected in parallel or in series and similarly each condenser can comprise a plurality of individual condenser circuits connected in parallel or in series. In this case, each individual condenser circuit can be connected to an individual evaporator circuit of the next loop by an independent heat pipe, as shown diagrammatically in FIG. 2.

Otherwise, each loop can comprise a single evaporator associated with a single condenser, and a plurality of loops of this type can be disposed in parallel.

Finally, any means can be replaced by equivalent means without departing from the scope of the invention.

What is claimed is:

1. A heat transfer device including a capillary-pumped first fluid loop including an evaporator situated on a satellite in the vicinity of a source of dissipated heat and a condenser connected by heat transfer means to said evaporator and situated on a deployable radiator panel of said satellite, in which heat transfer device said deployable radiator comprises at least two panels, said heat transfer device itself further comprises at least one second capillary-pumped fluid loop, said fluid loops are connected in cascade with each other so that the evaporator of each fluid loop other than said first fluid loop is on the same panel as the condenser of the preceding loop and the condenser of each fluid loop other than said first fluid loop is on the panel next to that carrying the condenser of said first loop, and said evaporator of one loop is connected to said condenser of the same loop by flexible heat transfer means.

2. The heat transfer device claimed in claim 1 wherein heat is transferred between said condenser of one loop and said evaporator of the next loop by means of at least one heat pipe.

3. The heat transfer device claimed in claim 1 wherein said evaporator of one or more of said loops takes the form of a plurality of individual evaporator circuits connected in parallel or in series with each other.

4. The heat transfer device claimed in claim 1 wherein said condenser of one or more of said loops takes the form of a plurality of individual condenser circuits connected in parallel or in series with each other.

* * * * *